(12) United States Patent
Jiang

(10) Patent No.: US 10,816,372 B2
(45) Date of Patent: Oct. 27, 2020

(54) MONITORING SYSTEM AND MOUNTING BASE THEREOF

(71) Applicant: CHICONY ELECTRONICS CO., LTD., New Taipei (TW)

(72) Inventor: Yi-Sing Jiang, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 44 days.

(21) Appl. No.: 16/391,525

(22) Filed: Apr. 23, 2019

(65) Prior Publication Data

US 2020/0166385 A1 May 28, 2020

(30) Foreign Application Priority Data

Nov. 27, 2018 (TW) .............................. 107142256 A

(51) Int. Cl.
*G01D 11/00* (2006.01)
*G01D 11/24* (2006.01)

(52) U.S. Cl.
CPC .................................. *G01D 11/245* (2013.01)

(58) Field of Classification Search
CPC ....... G01D 11/24; G01D 11/245; G01D 11/00
USPC .......................................................... 73/431
See application file for complete search history.

(56) References Cited

U.S. PATENT DOCUMENTS

| 3,776,649 A * | 12/1973 | Kemezys | F16C 11/069 403/90 |
| 5,746,548 A * | 5/1998 | Crandall | F16C 11/0604 248/481 |
| 7,246,781 B2 * | 7/2007 | Nam | A61H 19/44 248/516 |

* cited by examiner

*Primary Examiner* — Jamel E Williams
(74) *Attorney, Agent, or Firm* — Muncy, Geissler, Olds & Lowe, P.C.

(57) ABSTRACT

The present application discloses monitoring system, which includes a mounting base and a monitoring device. The mounting base includes a base, a first cover, a second cover and a fastening member. The base includes a ball shaft and a first wire accommodating portion located in the ball shaft. The first cover and the second cover are sleeved on the outside of the ball shaft. The second cover includes a second wire accommodating portion, an outer screw thread and a connecting portion, and the outer screw thread is adjacent to the connecting portion. One end of the fastening member is connected to the first cover, and the fastening member is screwed to the second cover. The monitoring device includes a housing connected to the connecting portion of the second cover, and a wire accommodated in the first wire accommodating portion and the second wire accommodating portion.

20 Claims, 10 Drawing Sheets

MONITORING SYSTEM AND MOUNTING BASE THEREOF

BACKGROUND APPLICATION

1. Technical Field

The present application relates to a monitoring system, particularly to a mounting base of a monitoring system.

2. Description of the Related Art

With people pay more attention on quality and safety of the public living environment, and also more concern about whether there is a security corner in the surrounding environment. At present, the monitoring system is used to reduce the security corners in public or private places. In general, a monitoring system includes a monitoring device and a mounting base for mounting the monitoring device thereon. Specifically, the monitoring device can be an image capturing device and/or a motion sensing device for observing or detecting changes or differences in environmental space. Specifically, the image capturing device can directly monitor the space where the image capturing device disposed. The motion sensing device can connects to an anti-theft system or a lighting system. When the motion sensing device detects there are person or other animals, the anti-theft system would send the alarm, or the lighting system would be turned on, so the motion sensing device can also be applied to environmental monitoring. Accordingly, in the present application, an image capturing device, a motion sensing device, or other sensing device that can perform an environmental monitoring function is generally referred to as a monitoring device.

The image area and viewing angle can be capture by the lens of the image capturing device is greatly limited. The sensing range can detected by the motion sensing device is also greatly limited. Therefore, the mounting base currently used in mounting the monitoring device has a rotatable mechanism, such as a universal joint, to increase the image area or sensing range. However, the universal joint needs to be added with a lot of components, thereby increasing the assembly steps of the mounting base. For example, it is necessary to additionally lock each of the components of the universal joint with screws. In other words, the mounting base with a rotatable mechanism is quite complicated in the process of assembly or disassembly. Actually, there is a need for improvement.

SUMMARY

In view of above problems, it is a major objective of the present application to provide a monitoring system and a mounting base thereof. By means of one of two covers (the second cover) having an outer screw thread and a fastening member having an inner screw thread structure, the two covers (the first and second cover) can be directly screwed to the outside of the ball shaft by the fastening member, and the problem that the assembly steps of the conventional mounting base with a rotatable mechanism are quite complicated can be solved.

To achieve the above objective, the present application provides a monitoring system having a mounting base and a monitoring device. The mounting base includes a base, a first cover, a second cover, and a fastening member. The base includes a ball shaft and a first wire accommodating portion, and the first wire accommodating portion is located in the ball shaft. The first cover is sleeved on the outside of the ball shaft, and the second cover is also sleeved on the outside of the ball shaft. The second cover includes a second wire accommodating portion, an outer screw thread, and a connecting portion. The second wire accommodating portion is in communication with the first wire accommodating portion, and the outer screw thread is adjacent to the connecting portion. One end of the fastening member is connected to the outside of the first cover. The fastening member includes an inner screw thread and is screwed to the second cover. The monitoring device includes a housing and a wire. The housing includes an accommodating groove connected to the connecting portion of the second cover. The wire is connected to the housing, and is accommodated in the first wire accommodating portion and the second wire accommodating portion.

To achieve the above objective, the present application further provides a mounting base for mounting a monitoring device thereon. The monitoring device includes a housing and a wire, the housing includes an accommodating groove, and the wire is connected to the housing. The mounting base includes a base, a first cover, a second cover, and a fastening member. The base includes a ball shaft and a first wire accommodating portion, and the first wire accommodating portion is located in the ball shaft. The first cover is sleeved on the outside of the ball shaft, and the second cover is also sleeved on the outside of the ball shaft. The second cover includes a second wire accommodating portion, an outer screw thread, and a connecting portion. The second wire accommodating portion is in communication with the first wire accommodating portion. The wire is accommodated in the first wire accommodating portion and the second wire accommodating portion. The outer screw thread is adjacent to the connecting portion, and the accommodating groove of the housing is connected to the connecting portion. One end of the fastening member is connected to the outside of the first cover. The fastening member includes an inner screw thread, and is screwed to the second cover.

According to an embodiment of the present application, the first cover includes a side opening. The first cover is sleeved to the ball shaft with the side opening.

According to an embodiment of the present application, the first cover includes a first sleeve portion and a protruding portion. The first sleeve portion is sleeved on the outside of the ball shaft. The protruding portion is extended outward from a top end of the first sleeve portion.

According to an embodiment of the present application, the fastening member includes a first opening and a second opening opposing each other. The inner diameter of the first opening is smaller than the outer diameter of the protruding portion of the first cover, and the protruding portion is located inside the first opening. The second cover is located at the second opening.

According to an embodiment of the present application, the first cover includes a first hook, and the second cover includes a second sleeve portion and a second hook. The second hook is located at the bottom of the second sleeve portion, and the first hook engages with the second hook.

According to an embodiment of the present application, the base includes a limiting groove, and the limiting groove located on the outside of the ball shaft. The second cover includes a limiting portion, and the limiting portion disposed in the second sleeve portion and located in the limiting groove.

According to an embodiment of the present application, the second cover includes a first waterproof member, and is sleeved on the outside of the connecting portion. Further, one surface of the first waterproof member is in contact with the accommodating groove of the housing.

According to an embodiment of the present application, the mounting base further includes a second waterproof member that is sleeved on the outside of the wire and accommodated together with the wire in the second wire accommodating portion. Further, one surface of the second waterproof member is in contact with the accommodating groove of the housing.

According to an embodiment of the present application, the base further includes a third hook located on the inner wall of the first wire accommodating portion. The wire includes a fourth hook located on the outside of the wire, and the third hook engages with the fourth hook.

According to an embodiment of the present application, the base further includes a third waterproof member, which is accommodated in the first wire accommodating portion and covers the outside of the wire.

As above, according to the monitoring system and its mounting base of the present application, the mounting base includes a base, a first cover, a second cover and a fastening member. The first cover and the second cover are respectively sleeved on the outside of the ball shaft of the base, and one end of the fastening member is connected to the first cover. Further, the second cover includes an outer screw thread, and the fastening member includes an inner screw thread. For assembly, the first cover is placed on the outside of the ball shaft and the fastening member is placed on the outside of the ball shaft, the housing is connected to the second cover, and then the second cover is sleeved on the outside of the ball shaft. Then, by the inner screw thread in cooperation with the outer screw thread, the fastening member can be directly screwed to the second cover, and the first cover is fixed at the same time. Accordingly, the effect of assembling the first cover and the second cover to the ball shaft can be achieved without using other locking structures, while the assembly steps and processes are simple.

DETAILED DESCRIPTION OF THE PREFERRED EMBODIMENT

Hereafter, the technical content of the present application will be better understood with reference to preferred embodiments.

Figure 1:
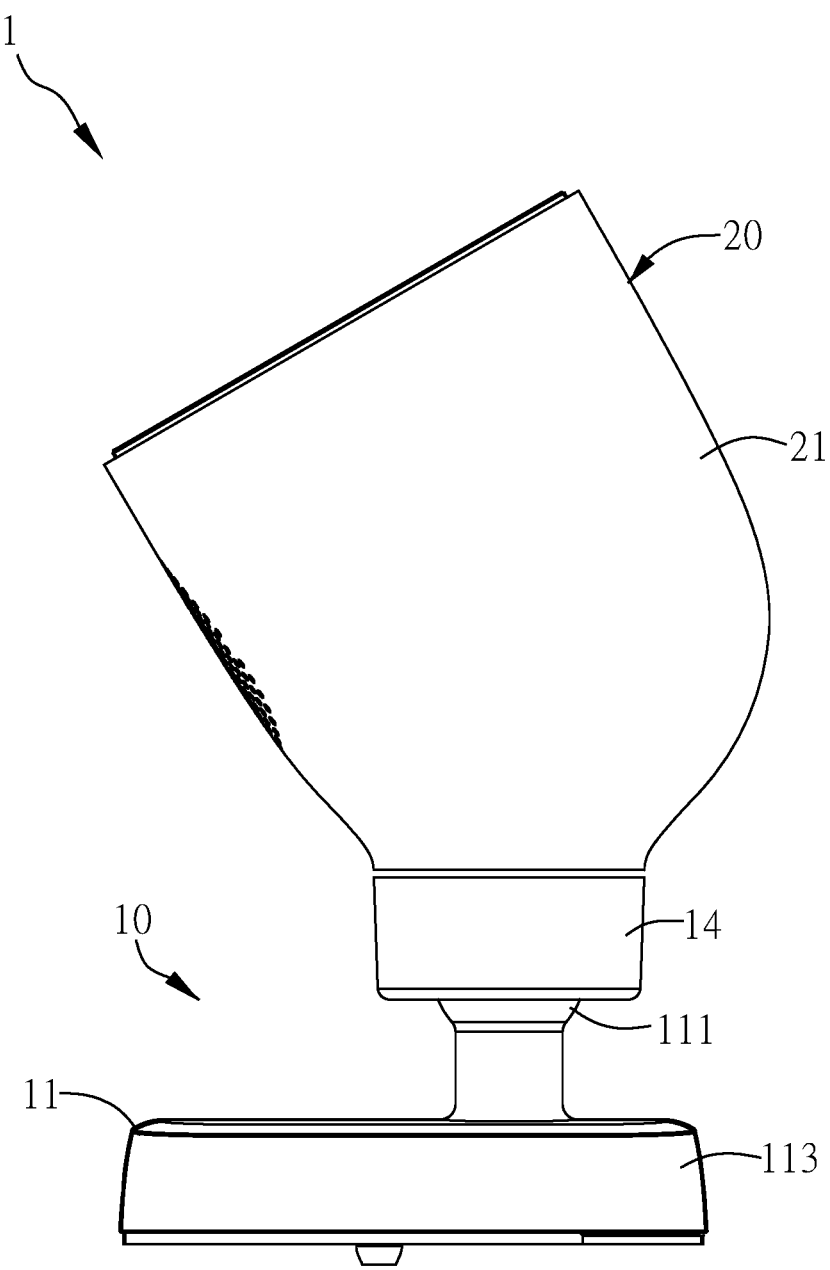
FIG. 1 is a schematic view of a monitoring system according to an embodiment of the present application.
Figure 2:
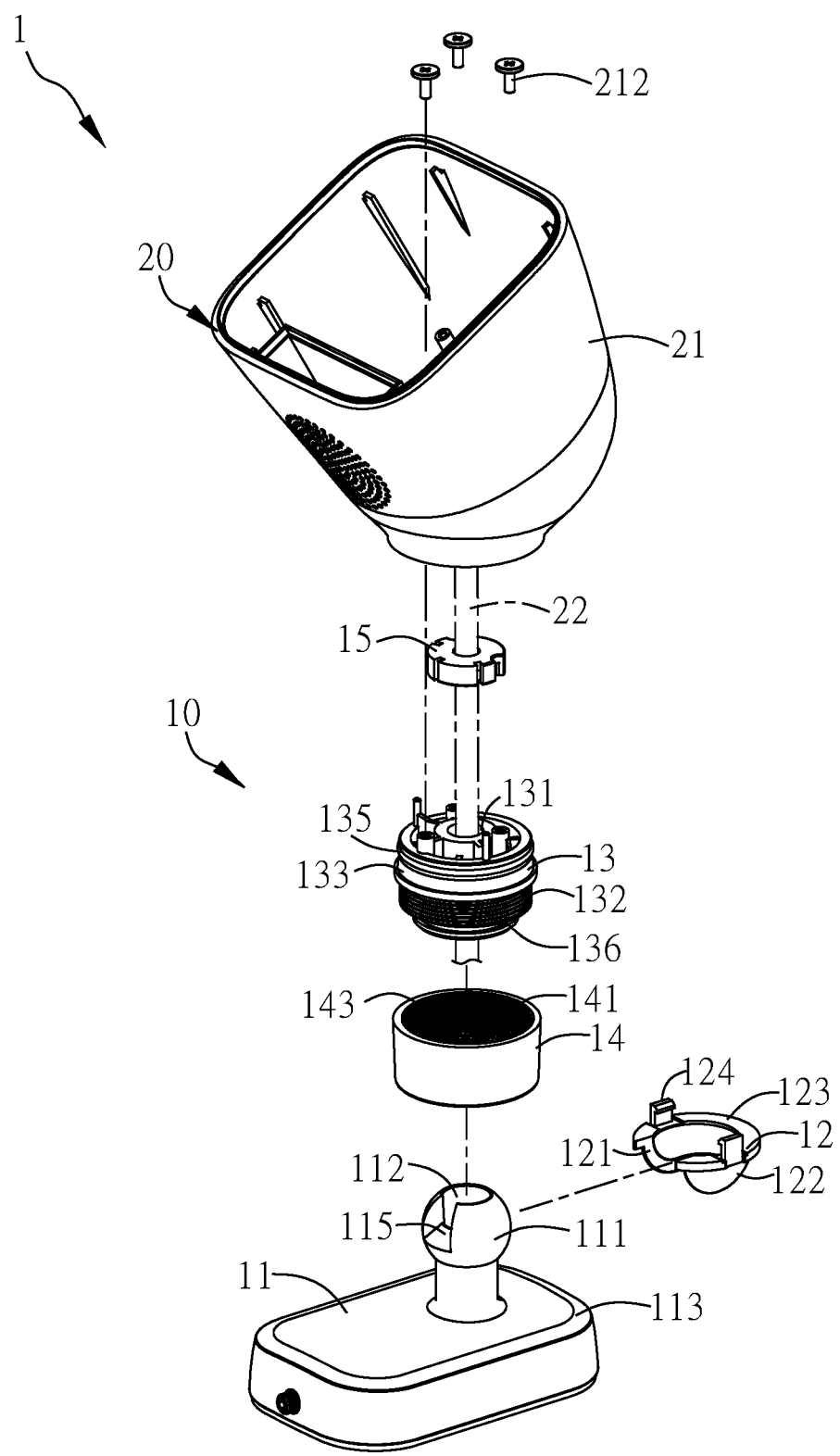
FIG. 2 is an exploded view of the monitoring system shown in FIG. 1.

FIG. 1 is a schematic view of a monitoring system according to an embodiment of the present application; FIG. 2 is an exploded view of the monitoring system shown in FIG. 1. Referring to FIG. 1 and FIG. 2, a monitoring system 1 includes a mounting base 10 and a monitoring device 20. The mounting base 10 is used for mounting the monitoring device 20 thereon, that is, the monitoring device 20 can be mounted onto the mounting base 10. After the assembly of the mounting base 10 and the monitoring device 20 is completed, the mounting base 10 can be installed on the wall of the environmental space needs be monitored, or the surface of other objects, but the present application is not limited thereto. Specifically, the monitoring device 20 may be an image capturing device and/or a motion sensing device, or an electronic device in combination with other devices, such as a combination of a motion sensing device and a lighting device, depending on the functions performed, but the present application is not limited thereto. In the present embodiment, the monitoring device 20 includes a housing 21 and a wire 22 connected to the housing 21. For example, if the monitoring device 20 is an image capturing device, the housing 21 is the housing of the image capturing device. Further, the lens module, the light source module and other electronic components (not shown), such as a printed circuit board (PCB), can disposed in the housing 21. The wire 22 is connected to the circuit board, and passed throughout from the housing 21. Therefore, the wire 22 is referred to herein as being connected to the housing 21.

In the present embodiment, the mounting base 10 includes a base 11, a first cover 12, a second cover 13, and a fastening member 14. The base 11 includes a ball shaft 111, a first wire accommodating portion 112, and a mounting seat 113. The ball shaft 111 is extended upward from the surface of the mounting seat 113, extended vertically upward from the mounting seat 113, and the mounting seat 113 can be a hollow structure. The first wire accommodating portion 112 is located inside the ball shaft 111 and can be in communication with the hollow structure inside the mounting seat 113. In addition, a circuit board can be disposed in the mounting seat 113, so that the circuit board can be electrically connected to the wire 22.

Figure 3:
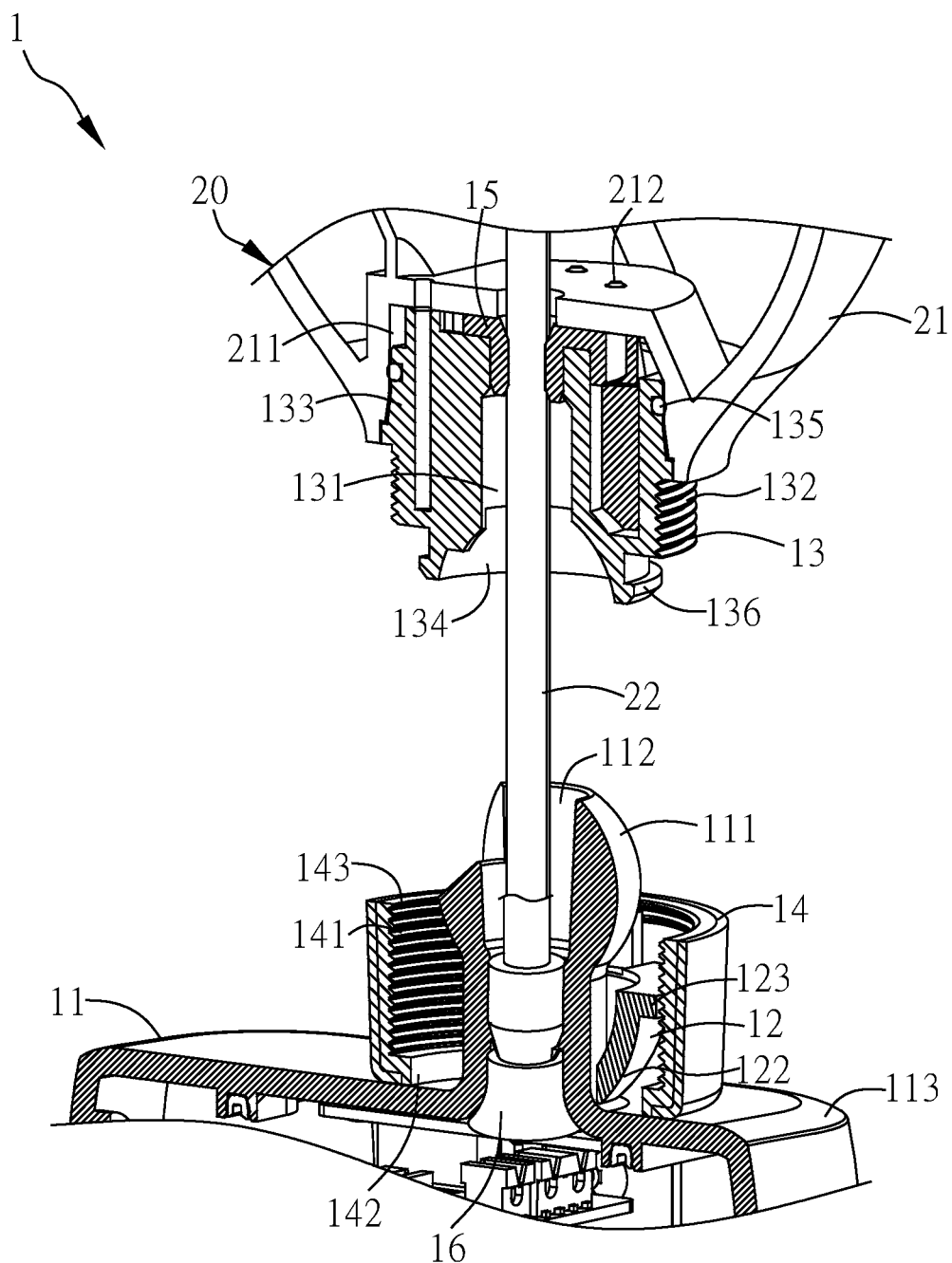
FIG. 3 is a schematic view showing the fastening member and the first cover shown in FIG. 2 located on the outside of the ball shaft.

FIG. 3 is a schematic view showing the fastening member and the first cover shown in FIG. 2 located on the outside of the ball shaft. Referring to FIG. 2 and FIG. 3, in the present embodiment, the fastening member 14 includes an inner screw thread 141 and a first opening 142 and a second opening 143 opposing each other. The fastening member 14 is a hollow cylindrical structure, and the inner screw thread 141 is located on the inner wall of the fastening member 14. The upper and lower openings are referred to herein as second opening 143 and first opening 142. In the perspective of FIG. 2 and FIG. 3, the first opening 142 is located on the lower side of the fastening member 14, and the second opening 143 is located on the upper side of the fastening member 14. When assembling the mounting base 10, the first opening 142 of the fastening member 14 is first aligned with the ball shaft 111 and passed through the ball shaft 111, and the fastening member 14 is directly placed on the mounting seat 113 and located on the outside of the ball shaft 111.

Then, the first cover 12 is placed on the outside of the ball shaft 111. As shown in FIG. 2, in the present embodiment, the first cover 12 includes a side opening 121. After the first cover 12 is sleeved to the outside of the ball shaft 111 with the side opening 121, the first cover 12 can be moved downward to the mounting seat 113 along the ball shaft 111, and located inside the fastening member 14. It should be noted that, in the perspective of FIG. 2 and FIG. 3, the mounting base 10 in the embodiment first assembles the lower half and the upper half components separately, and then assembles the lower half and the upper half components. As described above, the housing 21 of the monitoring device 20, the fastening member 14 and the first cover 12 are respectively assembled to the base 11, that is, the assembly of the lower half components. Hereafter, the assembly of the upper half components will be described, in which the housing 21 of the monitoring device 20 can be first mounted onto the second cover 13. As shown in FIG. 3, the second cover 13 includes a second wire accommodating portion 131, an outer screw thread 132, a connecting portion 133, and a second sleeve portion 134. The second wire accommodating portion 131 is located inside the second cover 13, and the position of the second wire accommodating portion 131 corresponds to the first wire accommodating portion 112.

The outer screw thread 132 and the connecting portion 133 are located on the outside of the second cover 13, in the perspective of FIG. 2 and FIG. 3, the second sleeve portion 134 is located at the bottom of the second cover 13. In the present embodiment, the outer screw thread 132 is adjacent to the connecting portion 133, the outer screw thread 132 is close to the second sleeve portion 134, and the connecting portion 133 is close to the top end of the second cover 13. The second wire accommodating portion 131 is passed through the second cover 13, such that the opening of one end of the second wire accommodating portion 131 is located at the connecting portion 133, and the opening of the opposite end is located at the second sleeve portion 134.

Further, the housing 21 of the monitoring device 20 includes an accommodating groove 211, and the wire 22 is passed throughout the accommodating groove 211. In this embodiment, the configuration of the accommodating groove 211 corresponds to the connecting portion 133 of the second cover 13, such that the accommodating groove 211 can be sleeved and connected to the connecting portion 133. Specifically, after the wire 22 is placed in the second wire accommodating portion 131, the accommodating groove 211 is sleeved to the outside of the connecting portion 133. Next, the housing 21 is locked to the connecting portion 133 of the second cover 13 by the screw 212. At this time, the wire 22 is accommodated in the second wire accommodating portion 131.

In other embodiments, the housing 21 can also be connected to the connecting portion 133 in other ways, such as, but not limited to, engaging, locking, or boding. In addition, an inner screw thread can be formed on the inner side of the accommodating groove 211, and an outer screw thread can be formed on the outer side of the connecting portion 133. The housing 21 can be locked to the second cover 13 by the inner screw thread of the accommodating groove 211 in cooperation with the outer screw thread of the connecting portion 133.

Preferably, the second cover 13 further includes a first waterproof member 135 sleeved on the outside of the connecting portion 133. The first waterproof member 135 is an elastic O-ring, which may be, a waterproof material, for example, but not limited to, rubber or silicone. When the accommodating groove 211 of the housing 21 is connected to the connecting portion 133 of the second cover 13, the surface of the first waterproof member 135 can contact and interfere with the accommodating groove 211 of the housing 21. This prevents moisture from entering the interior of housing 21 from the gap between the accommodating groove 211 and the connecting portion 133.

Preferably, the mounting base 10 further includes a second waterproof member 15, which is a cover made of rubber or silicone. The second waterproof member 15 has a hollow structure to be sleeved on the outside of the wire 22. Specifically, before the housing 21 is mounted to the second cover 13, the wire 22 can be first passed through the hollow structure of the second waterproof member 15. Next, the second waterproof member 15 together with the wire 22 is accommodated in the second wire accommodating portion 131. At this time, the accommodating groove 211 of the housing 21 is also sleeved to the outside of the connecting portion 133. The second waterproof member 15 is accommodated in the opening of the second wire accommodating portion 131 at the connecting portion 133, and the surface of the second waterproof member 15 contacts and interferes with the accommodating groove 211 of the housing 21, to prevent the moisture from entering the interior of the housing 21 by the second wire accommodating portion 131. This prevents moisture from damaging the circuit board placed inside the housing 21. In addition, the cushioning material property of the second waterproof member 15 can also prevent the wire 22 in the second wire accommodating portion 131 from being worn and broken due to long-term rotation of the housing 21.

It should be noted that there is no priority in assembling the lower half and upper half components. The foregoing is an example of assembling the lower half components first. In other embodiments, the upper half components can also be assembled first, but the present application is not limited thereto.

Figure 4:
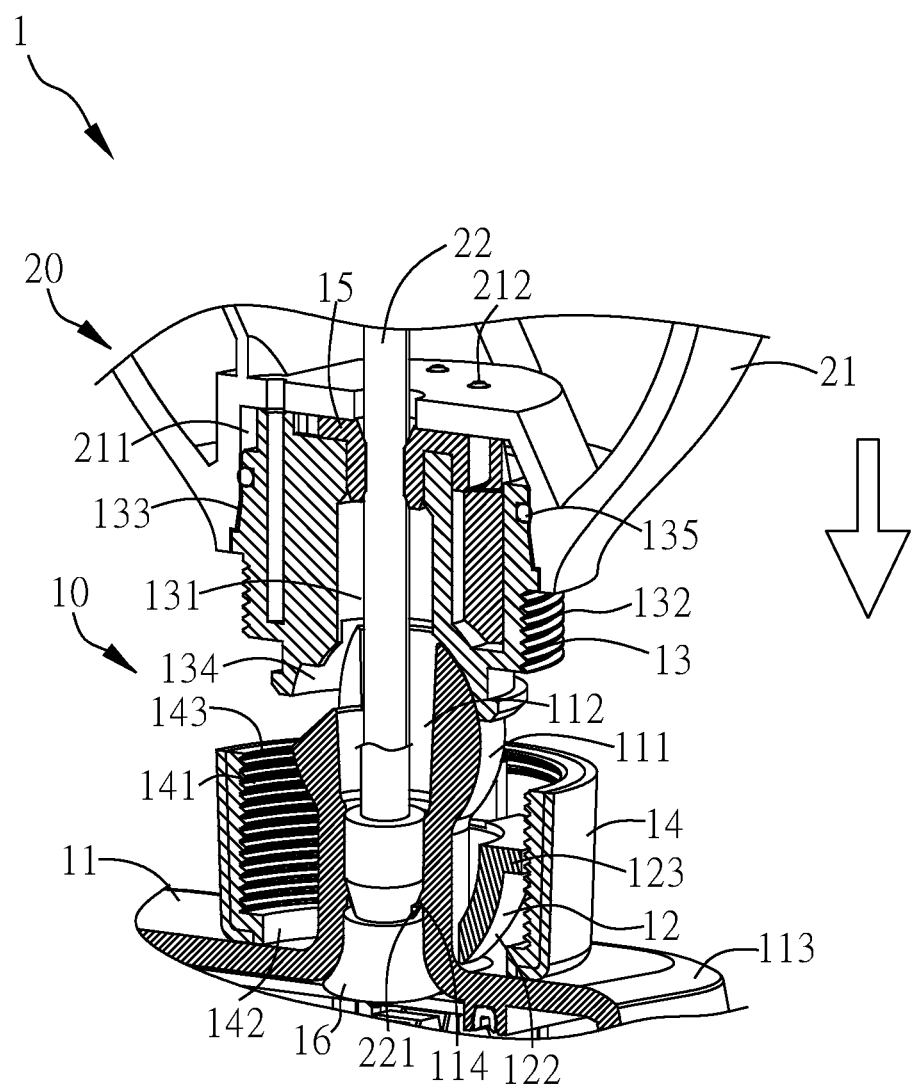
FIG. 4 is a schematic view of the second cover shown in FIG. 3 assembled to the ball shaft.

FIG. 4 is a schematic view of a second cover shown in FIG. 3 assembled to the ball shaft. Referring to FIG. 4, one end of the wire 22 is exposed from the opening of the second wire accommodating portion 131 at the second sleeve portion 134, so the wire 22 can be first placed in the first wire accommodating portion 112 of the base 11. Next, the second cover 13 and the housing 21 are moved downward, and the second sleeve portion 134 is sleeved on the outside of the ball shaft 111. The second sleeve portion 134 in the embodiment has a curved inner wall and cooperates with the spherical surface of the ball shaft 111, such that the second sleeve portion 134 can be sleeved on the outside of the ball shaft 111. At this time, the second wire accommodating portion 131 is in communication with the first wire accommodating portion 112, and the wire 22 is accommodated in the second wire accommodating portion 131 and the first wire accommodating portion 112 at the same time.

Preferably, the base 11 further includes a third hook 114, which is located on the inner wall of the first wire accommodating portion 112. Correspondingly, the wire 22 includes a fourth hook 221, which is located on the outside of the wire 22. The third hook 114 is a structure protruding from the inner wall of the first wire accommodating portion 112, and more close to the mounting seat 113, the third hook 114 more protrudes from the inner wall of the first wire accommodating portion 112. In the perspective of FIG. 4, the fourth hook 221 is a hook structure that tapers downward. When the wire 22 is accommodated in the first wire accommodating portion 112, the fourth hook 221 can be guided to move below the third hook 114, such that the third hook 114 and the fourth hook 221 are engaged with each other. If the second cover 13 moves upward, the fourth hook 221 can be limited by the third hook 114 to prevent the second cover 13 from being detached from the ball shaft 111. It is more advantageous for subsequent assembly.

Preferably, the base 11 further includes a third waterproof member 16. The third waterproof member 16 is accommodated in the wire accommodating portion 112, and covers the outside of the wire 22. In the present embodiment, the third waterproof member 16 is located at the opening of the first wire accommodating portion 112 close to the mounting seat 113, thereby preventing moisture from entering the mounting seat 113 from the first wire accommodating portion 112. This prevents moisture from damaging the circuit board located on the mounting seat 113. Specifically, after the wire 22 is accommodated in the first wire accommodating portion 112, preferably, after the mounting base 10 is assembled, the waterproof adhesive can be poured into the first wire accommodating portion 112 on the bottom surface of the mounting seat 113, and after the waterproof adhesive is cured, the third waterproof member of this embodiment is formed. In other embodiments, the third waterproof member 16 may also be a waterproof cover structure that is directly inserted into the first wire accommodating portion 112, but the present application is not limited thereto.

Figure 5:
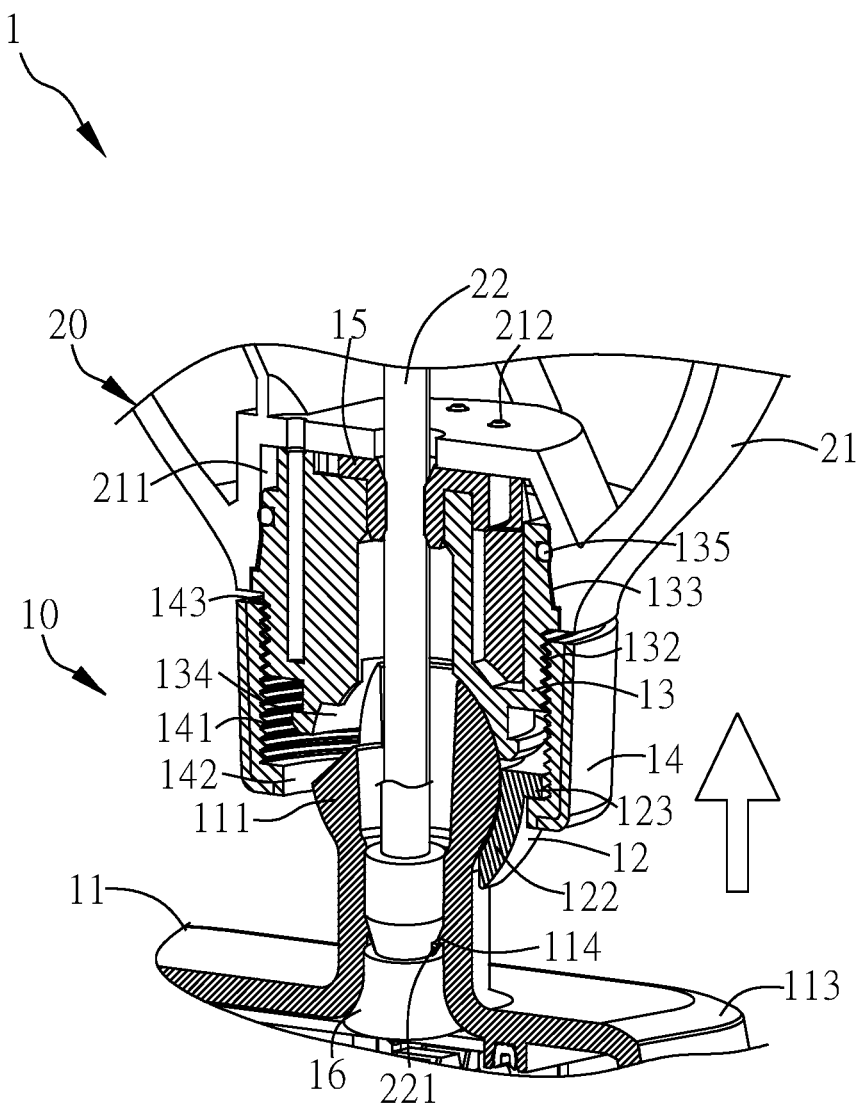
FIG. 5 is a schematic view of the first cover and the fastening member shown in FIG. 3 assembled to the ball shaft.

FIG. 5 is a schematic view of the first cover and the fastening member shown in FIG. 3 assembled to the ball shaft. Referring to FIG. 2 and FIG. 5, in the present embodiment, the first cover 12 further includes a first sleeve portion 122 and a protruding portion 123. The first sleeve portion 122 also has a curved inner wall and cooperates with the spherical surface of the ball shaft 111, such that the first sleeve portion 122 can be sleeved on the outside of the ball shaft 111. In the present embodiment, the end of the first sleeve portion 122 having the largest inner diameter is referred to as the top end. Further, the protruding portion 123 is extended outward from the top end of the first sleeve portion 122, that is, extended to the outside of the first sleeve portion 122.

In the present embodiment, the first opening 142 of the fastening member 14 has an inner diameter, which is smaller than the outer diameter of the protrusion portion 123 of the first cover 12. When the first cover 12 is sleeved to the ball shaft 111 with the side opening 121, the top end can be upward. Then, the fastening member 14 is moved from the mounting seat 113 toward the ball shaft 111, that is, when the fastening member 14 is moved upward, since the inner diameter of the first opening 142 is smaller than the outer diameter of the protruding portion 123, the first cover 12 can be driven to move in the direction of the ball shaft 111. At this time, the top end of the protruding portion 123 and the first sleeve portion 122 are located inside the first opening 142, and the other portions of the first sleeve portion 122 are exposed from the first opening 142. In other words, in this embodiment, the first opening 142 and the protruding portion 123 are designed such that one end of the fastening member 14 is connected to the outside of the first cover 12. In other embodiments, the fastening member 14 and the first cover 12 can also be connected by other means, for example, by using other locking structures, the present application is not limited thereto.

Figure 6:
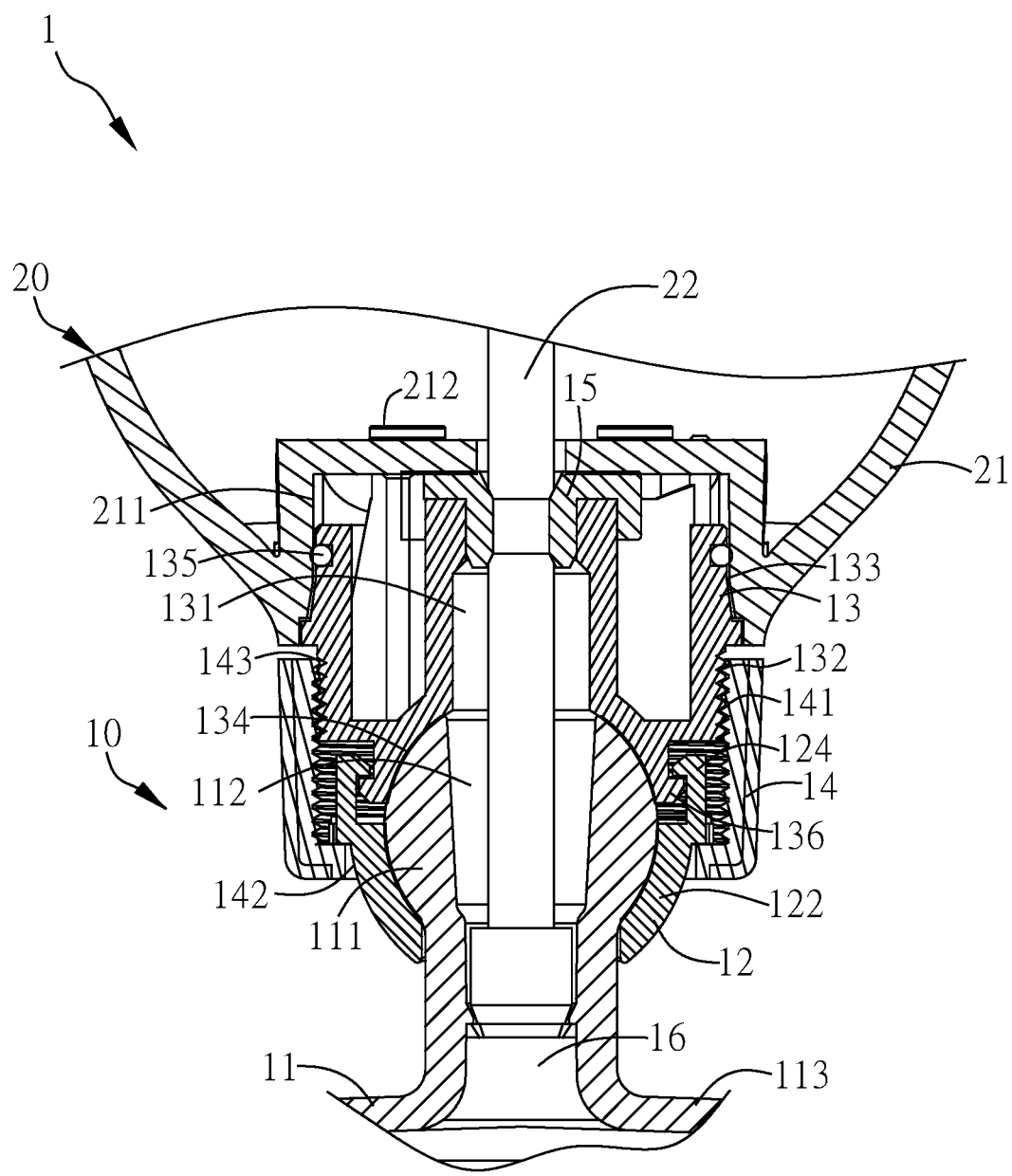
FIG. 6 is a schematic view of the first cover and the fastening member shown in FIG. 5 in another viewing angle.

After the first cover 12 is moved by the fastening member 14 in the direction of the ball shaft 111, the first sleeve portion 122 of the first cover 12 is sleeved on the outside of the ball shaft 111. FIG. 6 is a schematic view of the first cover and the fastening member shown in FIG. 5 in another viewing angle. Referring to FIGS. 2, 5, and 6, preferably, the first cover 12 includes a first hook 124, and the first hook 124 is extended upward from the top end of the first sleeve portion 122. Correspondingly, the second cover 13 includes a second hook 136, and the second hook 136 is located at the bottom of the second sleeve portion 134. When the first sleeve portion 122 of the first cover 12 is sleeved on the outside of the ball shaft 111, the first hook 124 corresponds to the second hook 136, such that the first hook 124 can engage with the second hook 136. Accordingly, the relative positions of the first cover 12 and the second cover 13 are initially fixed by the first hook 124 and the second hook 136.

When the fastening member 14 is moved from the mounting seat 113 to the ball shaft 111 and moved to the outside of the second cover 13, the inner screw thread 141 of the fastening member 14 and the outer screw thread 132 of the second cover 13 cooperate with each other. The fastening member 14 is locked to the second cover 13 by rotating the fastening member 14. In other words, in this embodiment, the fastening member 14 is screwed to the second cover 13. At this time, the first cover 12 is located at the first opening 142 of the fastening member 14, and the second cover 13 is located at the second opening 143 of the fastening member 14. Accordingly, the relative positions of the first cover 12 and the second cover 13 can be fixed again, and the first cover 12 and the second cover 13 can be pressed to make the first sleeve portion 122 and the second sleeve portion 134 more close to the ball shaft 111.

In other embodiments, when the fastening member 14 is rotated and released from the second cover 13, the first hook 124 and the second hook 136 are continuously engaged, to maintain the waterproofness of the mounting base 10.

Figure 7:
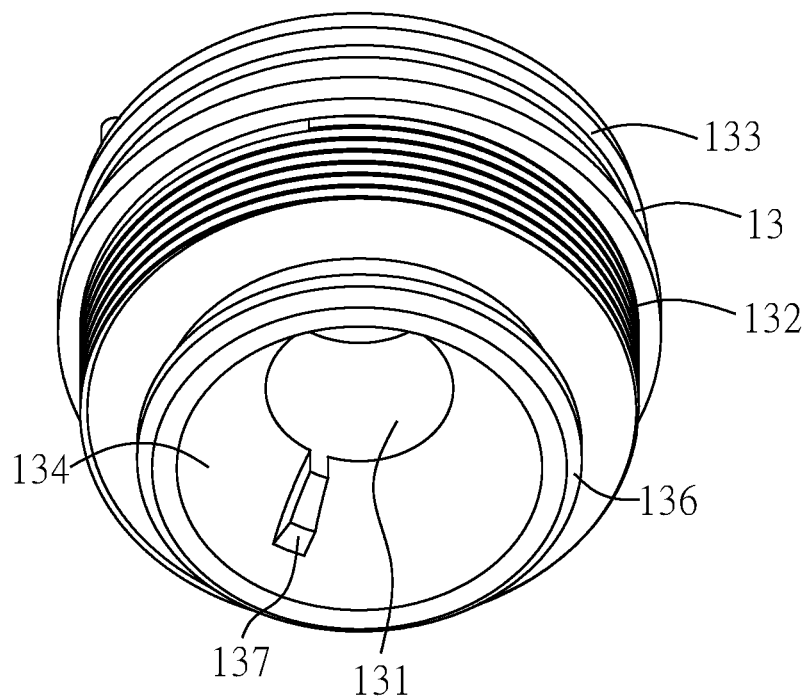
FIG. 7 is a schematic view of the second cover shown in FIG. 2 in another viewing angle.
Figure 8B:
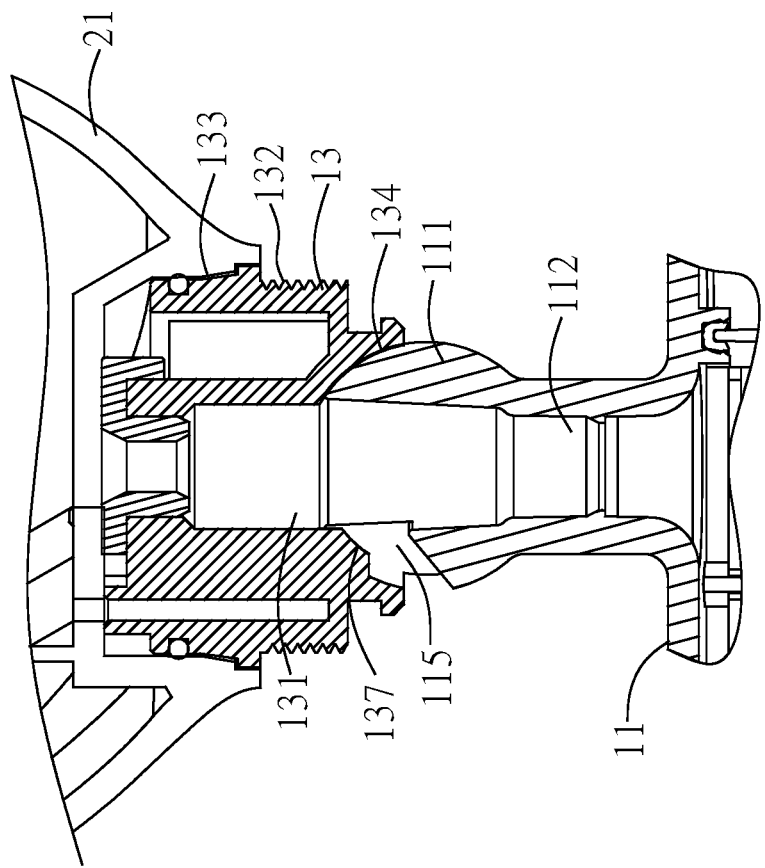
FIG. 8B illustrates a cross-sectional view in the direction A-A in FIG. 8A.
Figure 8A:
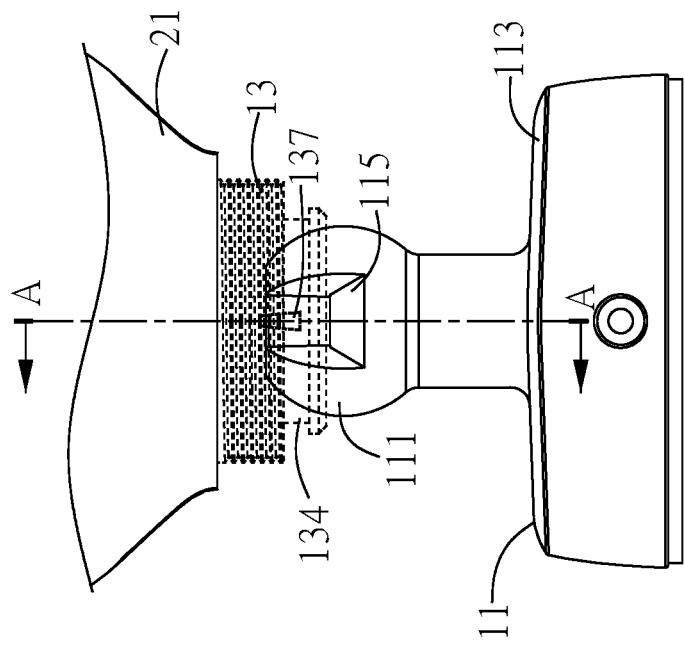
FIG. 8A is a schematic view of the housing, the second cover, and the base shown in FIG. 2.

When the housing 21 of the monitoring device 20 is rotated, the second cover 13 can be rotated relative to the ball shaft 111, and the fastening member 14 and the first cover 12 are also rotated together with the second cover 13. To limit the rotation angle of the housing 21, preferably, the base 11 includes a limiting groove 115 (as shown in FIG. 2), and the second cover 13 includes a limiting portion 137, as shown in FIG. 7. FIG. 7 is a schematic view of the second cover shown in FIG. 2 in another viewing angle. The limiting groove 115 is located outside the ball shaft 111, that is, the limiting groove 115 is formed on the surface of the ball shaft 111. FIG. 8A is a schematic view of the housing, the second cover and the base shown in FIG. 2, and the housing shown in FIG. 8A is swinging upwards. Referring to FIG. 7 and FIG. 8A, the limiting portion 137 is disposed in the second sleeve portion 134. When the second sleeve portion 134 is sleeved on the outside of the ball shaft 111, the limiting portion 137 is located in the limiting groove 115.

Figure 9:
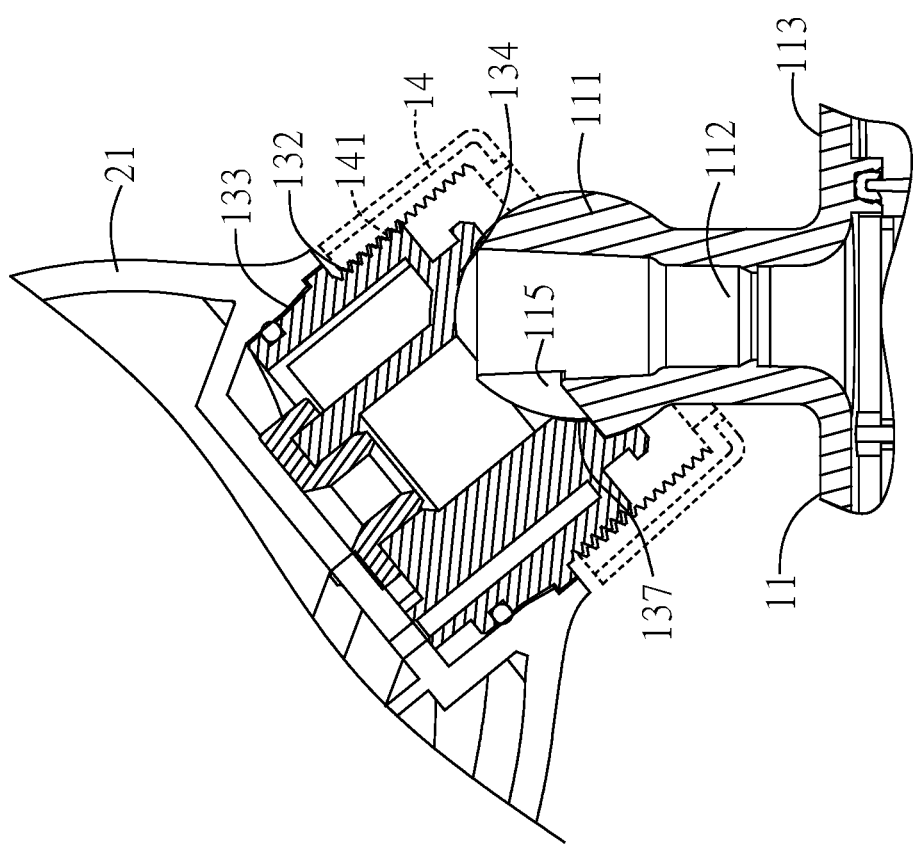
FIG. 9 is a schematic cross-sectional view of the housing, the second cover, the fastening member, and the base shown in FIG. 2.
Figure 10B:
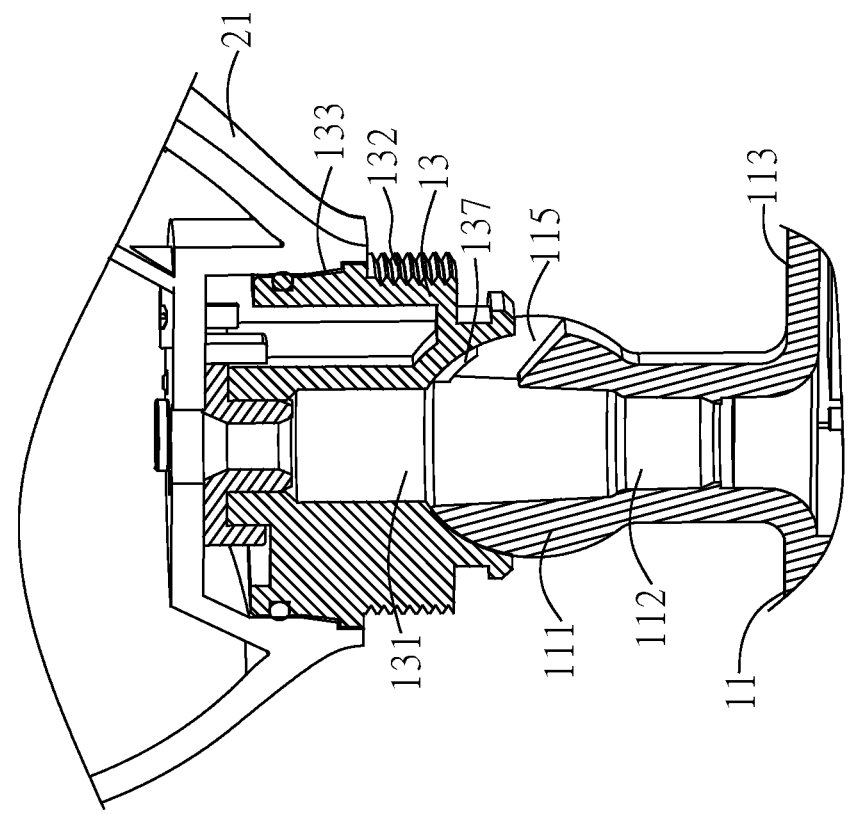
FIG. 10B illustrates a cross-sectional view in the direction A-A in FIG. 10A.
Figure 10A:
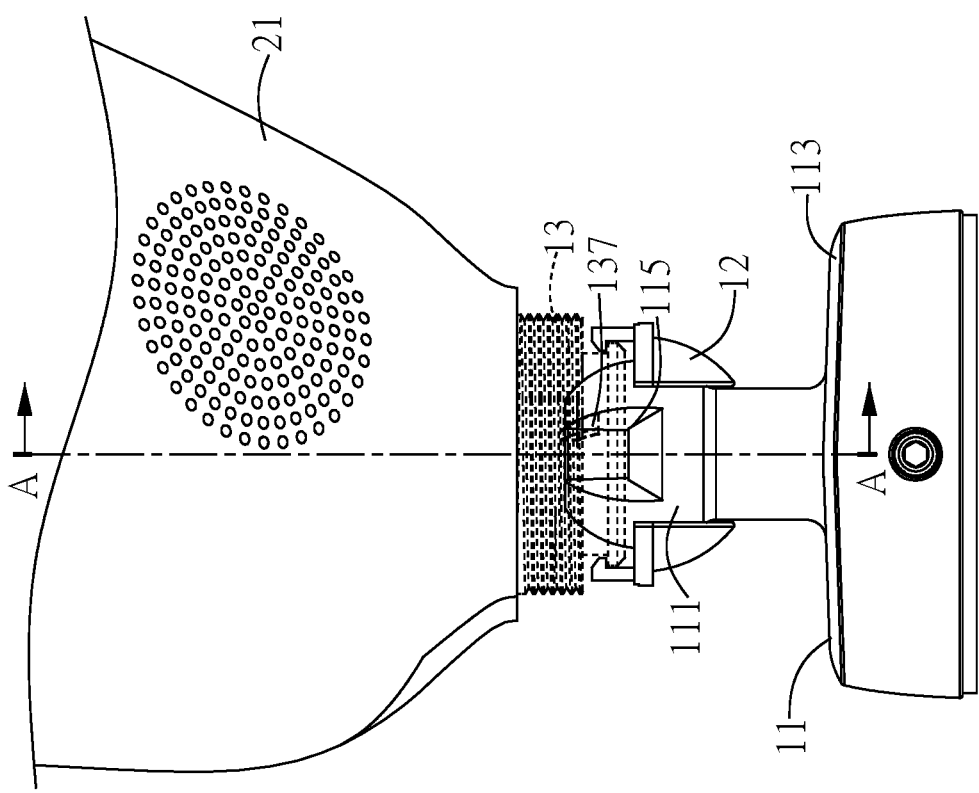
FIG. 10A is a schematic view of the housing, the second cover, and the base shown in FIG. 2.

When the housing 21 drives the second cover 13 to rotate, the limiting portion 137 also moves in the limiting groove 115. If the swing amplitude of the housing 21 is too large, the limiting groove 137 can be abutted by the limiting groove 115 to limit the swinging angle of the housing 21. FIG. 8B illustrates a cross-sectional view in the direction A-A in FIG. 8A. Referring to FIG. 8A and FIG. 8B, when the limiting portion 137 and the top end of the limiting groove 115 are in contact with each other, the second cover 13 can be restricted, and the housing 21 can be limited from continuing to swing upward. FIG. 9 is a schematic cross-sectional view of the housing, the second cover, the fastening member and the base shown in FIG. 2, and the housing shown in FIG. 9 is swinging downward. When the limiting portion 137 and the bottom of the limiting groove 115 are in contact with each other, the housing 21 can be limited from continuing to swing downward. FIG. 10A is a schematic view of the housing, the second cover and the base shown in FIG. 2; and FIG. 10B illustrates a cross-sectional view in the direction A-A in FIG. 10A. The housing 21 shown in FIG. 10A and FIG. 10B is swinging to the right. In the perspective of FIG. 10A and FIG. 10B, when the limiting portion 137 and the right inner wall of the limiting groove 115 are in contact with each other, the housing 21 can be limited from continuing to swing to the right. Similarly, when the limiting portion 137 and the left inner wall of the limiting groove 115 are in contact with each other, the housing 21 can be limited from continuing to swing to the left. Moreover, the limiting portion 137 of the second cover 13 and the limiting groove 115 of the base 11 not only can limit the swinging angle (upward, downward, left, and right) of the wire 22, but limit the swinging of the wire 22 in the first wire accommodating portion 112. This prevents the housing 21 from being worn and broken due to long-term rotation.

As described above, according to the monitoring system and its mounting base of the present application, the mounting base includes a base, a first cover, a second cover and a fastening member. The first cover and the second cover are respectively sleeved on the outside of the ball shaft of the base, and one end of the fastening member is connected to the first cover. Further, the second cover includes an outer screw thread, and the fastening member includes an inner screw thread. For assembly, the first cover is placed on the outside of the ball shaft and the fastening member is placed on the outside of the ball shaft, the housing is connected to the second cover, and then the second cover is sleeved on the outside of the ball shaft. Then, by the inner screw thread in cooperation with the outer screw thread, the fastening member can be directly screwed to the second cover, and the first cover and the second cover are fixed at the same time. Accordingly, the effect of assembling the first cover and the second cover to the ball shaft can be achieved without using other locking structures, while the assembly steps and processes are simple.

It should be noted that the described embodiments are only for illustrative and exemplary, and that various changes and modifications may be made to the described embodiments without departing from the scope of the application as disposed by the appended claims.

What is claimed is:
1. A monitoring system, comprising:
 a mounting base, comprising:
  a base, which includes a ball shaft and a first wire accommodating portion, and the first wire accommodating portion is located in the ball shaft;
  a first cover, which is sleeved on the outside of the ball shaft;
  a second cover, which is sleeved on the outside of the ball shaft, the second cover includes a second wire accommodating portion, an outer screw thread and a connecting portion, the second wire accommodating portion is in communication with the first wire accommodating portion, and the outer screw thread is adjacent to the connecting portion; and
  a fastening member, one end of the fastening member is connected to the outside of the first cover, the fastening member includes an inner screw thread and is screwed to the second cover; and
 a monitoring device, comprising:

a housing, which includes an accommodating groove connected to the connecting portion of the second cover; and
  a wire, which is connected to the housing and accommodated in the first wire accommodating portion and the second wire accommodating portion.

2. The monitoring system as claimed in claim 1, wherein the first cover includes a side opening, and the first cover is sleeved to the ball shaft with the side opening.

3. The monitoring system as claimed in claim 1, wherein the first cover includes a first sleeve portion and a protruding portion, the first sleeve portion is sleeved on the outside of the ball shaft, and the protruding portion is extended outward from a top end of the first sleeve portion.

4. The monitoring system as claimed in claim 3, wherein the fastening member includes a first opening and a second opening opposing each other, the inner diameter of the first opening is smaller than the outer diameter of the protruding portion of the first cover, the protruding portion is located inside the first opening, and the second cover is located at the second opening.

5. The monitoring system as claimed in claim 3, wherein the first cover includes a first hook, the second cover includes a second sleeve portion and a second hook, the second hook is located at the bottom of the second sleeve portion, and the first hook engages with the second hook.

6. The monitoring system as claimed in claim 1, wherein the base includes a limiting groove located on the outside of the ball shaft, and the second cover includes a limiting portion, the limiting portion is disposed in the second sleeve portion and located in the limiting groove.

7. The monitoring system as claimed in claim 1, wherein the second cover includes a first waterproof member sleeved on the outside of the connecting portion, and one surface of the first waterproof member is in contact with the accommodating groove of the housing.

8. The monitoring system as claimed in claim 1, wherein the mounting base further includes a second waterproof member sleeved on the outside of the wire and accommodated together with the wire in the second wire accommodating portion, and one surface of the second waterproof member is in contact with the accommodating groove of the housing.

9. The monitoring system as claimed in claim 1, wherein the base further includes a third hook located on the inner wall of the first wire accommodating portion, the wire includes a fourth hook located on the outside of the wire, and the third hook engages with the fourth hook.

10. The monitoring system as claimed in claim 1, wherein the base further includes a third waterproof member that is accommodated in the first wire accommodating portion and covers the outside of the wire.

11. A mounting base, used for mounting a monitoring device thereon, wherein the monitoring device includes a housing and a wire, the housing includes an accommodating groove, and the wire is connected to the housing, the mounting base comprising:
 a base, which includes a ball shaft and a first wire accommodating portion, and the first wire accommodating portion is located inside the ball shaft;
 a first cover, which is sleeved on the outside of the ball shaft;
 a second cover, which is sleeved on the outside of the ball shaft, the second cover includes a second wire accommodating portion, an outer screw thread and a connecting portion, the second wire accommodating portion is in communication with the first wire accommodating portion, the wire is accommodated in the first wire accommodating portion and the second wire accommodating portion, the outer screw thread is adjacent to the connecting portion, and the accommodating groove of the housing is connected to the connecting portion; and a fastening member, one end of the fastening member is connected to the outside of the first cover, the fastening member includes an inner screw thread, and the fastening member is screwed to the second cover.

12. The mounting base as claimed in claim 11, wherein the first cover includes a side opening, and the first cover is sleeved to the ball shaft with the side opening.

13. The mounting base as claimed in claim 11, wherein the first cover includes a first sleeve portion and a protruding portion, the first sleeve portion is sleeved on the outside of the ball shaft, and the protruding portion is extended outward from a top end of the first sleeve portion.

14. The mounting base as claimed in claim 13, wherein the fastening member includes a first opening and a second opening opposing each other, the inner diameter of the first opening is smaller than the outer diameter of the protruding portion of the first cover, the protruding portion is located inside the first opening, and the second cover is located at the second opening.

15. The mounting base as claimed in claim 13, wherein the first cover includes a first hook, the second cover includes a second sleeve portion and a second hook, the second hook is located at the bottom of the second sleeve portion, and the first hook engages with the second hook.

16. The mounting base as claimed in claim 11, wherein the base includes a limiting groove located on the outside of the ball shaft, and the second cover includes a limiting portion, the limiting portion is disposed in the second sleeve portion and in the limiting groove.

17. The mounting base as claimed in claim 11, wherein the second cover includes a first waterproof member sleeved on the outside of the connecting portion, and one surface of the first waterproof member is in contact with the accommodating groove of the housing.

18. The mounting base as claimed in claim 11, wherein the mounting base further includes a second waterproof member sleeved on the outside of the wire and accommodated together with the wire in the second wire accommodating portion, and one surface of the second waterproof member is in contact with the accommodating groove of the housing.

19. The mounting base as claimed in claim 11, wherein the base further includes a third hook located on the inner wall of the first wire accommodating portion, the wire includes a fourth hook located on the outside of the wire, and the third hook engages with the fourth hook.

20. The mounting base as claimed in claim 11, wherein the base further includes a third waterproof member accommodated in the first wire accommodating portion and covers the outside of the wire.

* * * * *